Patented June 8, 1937

2,083,223

UNITED STATES PATENT OFFICE 2,083,223

PROCESS FOR BREAKING PETROLEUM EMULSIONS

Melvin De Groote, St. Louis, Mo., assignor to The Tret-O-Lite Company, Webster Groves, Mo., a corporation of Missouri No Drawing. Application December 24, 1936, Serial No. 117,584

13 Claims. (Cl. 196—4)

This invention relates to the treatment of emulsions of mineral oil and water, such as petroleum emulsions, for the purpose of separating the oil from the water.

Petroleum emulsions are of the water-in-oil type, and comprise fine droplets of naturally-occurring waters or brines, dispersed in a more or less permanent state throughout the oil which constitutes the continuous phase of the emulsion. They are obtained from producing wells and from the bottom of oil storage tanks, and are commonly referred to as "cut oil", "roily oil", "emulsified oil" and "bottom settlings".

The object of my invention is to provide a novel and inexpensive process for separating emulsions of the character referred to into their component parts of oil and water or brine.

Briefly described, my process consists in subjecting a petroleum emulsion of the water-in-oil type to the action of a treating agent or demulsifying agent of the kind hereinafter described, thereby causing the emulsion to break down and separate into its component parts of oil and water or brine, when the emulsion is permitted to remain in a quiescent state after treatment, or is subjected to other equivalent separatory procedures.

The reagent or demulsifying agent contemplated for use in my present process consists of or comprises a sulfonic acid derivative of an alkylated aromatic compound characterized by the fact that the alkyl group or radical is substituted in place of a nuclear hydrogen atom and contains more than 12 carbon atoms and not more than 30 carbon atoms.

Sulfonic acid derivatives of aromatic hydrocarbons, and particularly those in which one or more alkyl groups are substituted in the aromatic nucleus, have been employed for some time as demulsifying agents. Such alkyl group, as distinguished from the aromatic nucleus itself, is characterized by freedom from substituent groups. Although aromatic sulfonic acids, or their salts, in absence of nuclear substituted groups, may show some demulsifying action, it is well known that this property is greatly enhanced by the introduction of alkyl groups of the kind previously described. Some improvement is gained by the introduction of alkyl groups having one or two carbon atoms, such as a methyl radical or an ethyl radical. However, the introduction of alkyl groups having 3, 4, 5, or 6 carbon atoms is markedly more effective. In a general way the effectiveness is most marked with the introduction of alkyl groups having 3, 4, or 5 carbon atoms. The introduction of alkyl groups having 6 or 8 carbon atoms, such as hexyl radicals or octyl radicals, still yield a very effective demulsifying agent. However, this effectiveness disappears rather rapidly as the number of carbon atoms increases. I have found, however, that the effectiveness of the demulsifying agent again increases if the alkyl group contains more than 12 carbon atoms and particularly if it contains 16 to 30 carbon atoms. The present process is concerned with breaking oil field emulsions, or the like, by means of an alkylated aromatic sulfonic derivative in which the alkyl radical or residue contains more than 12 carbon atoms and not over 30 carbon atoms.

Materials of the kind contemplated for use in the present process may be obtained in various manners, such as the reaction between an alkyl halide and an aromatic material in presence of a condensing agent, such as aluminum chloride, zinc chloride, etc., in the presence or absence of dry hydrochloric acid. The alkylated aromatic material thus obtained may be sulfonated in the customary manner employed for the manufacture of alkylated aromatic sulfonic acids of the kind in which the alkyl radical contains less than 12 carbon atoms. Naturally, an aromatic compound could be converted into a sulfonic acid and then alkylated so as to introduce an alkyl group of the kind in which there are present more than 12 carbon atoms and not over 30 carbon atoms.

I prefer to prepare the desired alkylated aromatic material in the manner described in U. S. Patent #2,061,593, dated November 24, 1936, to Robinson. This procedure is particularly desirable because the long chain alkyl radicals are derived from naturally-occurring waxes or the like, at a relatively low cost, and furthermore because the products of side reactions may be separated if desired and, if not separated, exhibit effective demulsifying properties after sulfonation. It is to be noted that this aforementioned patent is concerned only with the manufacture of relatively long chain nuclear alkyl derivatives of aromatic compounds and not with the sulfo derivatives thereof. However, as previously pointed out, the sulfo derivatives are obtainable by the conventional sulfonation process employed in the manufacture of similar compounds in which the alkyl group or groups contain fewer carbon atoms. Such sulfonation usually is obtained by action of sulfuric acid or by action of what is known as a strong sulfonating agent, and may, of course, yield polysulfonic acids as well as monosulfonic acids.

By the expression "strong sulfonating agents" is meant sulfonating agents of greater sulfonating power than 100% sulfuric acid. Included among such sulfonating agents are compounds which per se have a greater sulfonating power than 100% sulfuric acid, such as, for example, sulfur trioxide, chlorsulfonic acid, brom-sulfonic acid, oleum and acetyl sulfuric acid. In practice, it is preferable to employ this class of sulfonating agents, and especially desirable results have been obtained with chlorsulfonic acid. Where sulfur trioxide is employed, it may be introduced into the reaction mixture either in gaseous, liquid or solid form. As examples of other strong sulfonating agents may be mentioned milder sulfonating agents such as sulfuric acid in combination with reagents capable of removing water from the reaction mass, such as, for example, acetyl chloride, glacial acetic acid, acetic anhydride, propionic acid, propionic anhydride, phosphorous pentoxide, phosphorous oxychloride and boric anhydride. If desired, dehydrating agents may be employed in connection with the sulfonating agents which in themselves are strongly sulfonating, viz. sulfur trioxide, chlorsulfonic acid, oleum and the like, but there appears to be very little added advantage in such a procedure.

Sulfonation is customarily followed by a washing process in which the sulfonated mass is mixed with water or some aqueous medium, such as a solution of sodium sulfate or the like, mixed thoroughly, and then permitted to separate. After separation the acidic waste-water is withdrawn and the acid mass is employed as such or after conversion into salts or esters as hereinafter described in greater detail.

The production of relatively long chain nuclear alkyl derivatives of aromatic compounds as described in the said aforementioned Robinson patent, relates to the use of raw materials, such as spermaceti, wool wax, beeswax, carnauba wax, Arctic sperm oil, flax wax, palm wax, Chinese wax, etc. Spermaceti consists of cetylpalmitate; wool wax contains ceryl and melissyl myristate; beeswax contains myricyl palmitate; carnauba wax is chiefly myricyl melissate; Arctic sperm oil contains lauryl oleate; flax wax contains ceryl palmitate; palm wax contains melissyl melissate; and Chinese wax is mostly ceryl cerotate. Similar synthetic waxes obtained by combining alcohols derived synthetically, such as octadecyl alcohol, stearyl alcohol, oleyl alcohol, ricinoleyl alcohol, naphthenyl alcohols, with suitable fatty acids, such as oleic acid, stearic acid, palmitic acid, etc. may be employed instead of the naturally-occurring waxes. The method of manufacture of the nuclear alkyl derivatives will be illustrated by the following examples, which are substantially the same as those described in the aforementioned Robinson patent.

Example 1

2 parts of spermaceti, 1 part of phenol, and 1 part of zinc chloride are agitated and heated under a reflux condenser at approximately 185° for about 16 hours. The mixture is diluted with water, and the oily portion is separated and washed first with dilute hydrochloric acid and then with water until reasonably free from water-soluble products. The resulting oil is fractionally distilled in vacuo. The fraction boiling from 230° to 260° at 13 mm. is collected separately. It consists chiefly of cetyl phenol.

Example 2

200 parts of spermaceti and 50 parts of phenol are mixed thoroughly, and to this mixture 80 parts of aluminum chloride (anhydrous) are added in small portions so that the temperature of the reaction mass does not exceed 100°. The mixture is held at about 100° for about one hour after the last addition of aluminum chloride. Thereafter, the temperature is raised to 150° to 175° and held there over a period of about 2 hours. The mixture is then heated rapidly to about 225°, held there for 20 minutes, cooled and diluted with water. The oil is separated, washed with dilute hydrochloric acid and water till reasonably free from water-soluble products, and then vacuum distilled. The fraction boiling from 230° to 265° at 13 mm. is collected separately. It consists chiefly of cetyl phenol.

Example 3

300 parts of spermaceti, 150 parts phenol, 75 parts zinc chloride, and 12 parts of concentrated hydrochloric acid are mixed and heated to boiling under a reflux condenser for 18 hours. The mixture is then diluted with water and the oily portion is washed with water till practically free from water-soluble impurities. The resulting oil is fractionally distilled in vacuo. The fraction boiling from 230° to 265° at 13 mm. is collected. It is chiefly cetyl phenol.

Example 4

A mixture of 200 parts of carnauba wax, 100 parts of phenol and 100 parts of zinc chloride are heated under a reflux condenser at about 180° for approximately 18 hours. The condensation mass is diluted with water, and 100 parts of benzene which acts as a flux. The oily mass is washed with water until reasonably free from water-soluble products. The oil remaining is distilled in vacuo. The fraction boiling from 290° to 320° at 5 mm. pressure is collected. It is a yellow wax-like solid, comprising chiefly ceryl phenol.

While the above examples, which are concerned with the preparation of the alkyl derivatives prior to sulfonation, employ phenol with the aid of zinc chloride or aluminum chloride as condensing agents, it is to be noted that numerous variations are applicable. Similarly, non-hydroxy materials, such as benzene, toluene, cymene, naphthalene, methyl naphthalene and their derivatives may be alkylated. Such derivatives may contain halogen atoms, alkyl radicals, alkoxy radicals, carboxy radicals and other radicals as nuclear substituents. One may employ polycyclic phenols, such as alpha or beta naphthol or naphthols derived from methyl naphthalene and the like. It is understood, of course, that during the sulfonation process another alkyl group, having fewer than 12 carbon atoms, may be introduced in the same manner that is employed for the manufacture of materials, such as propylated naphthalene sulfonic acid, butylated naphthalene sulfonic acid, etc. Such sulfonation processes are usually conducted by having present materials, such as propyl hydrogen sulfate or butyl hydrogen sulfate during the sulfonation process.

The most desirable reagents and the ones which are most readily prepared are those derived from the monohydric phenols, such as ordinary phenol (hydroxy benzene), various cresols, xylenols, etc. The production of these materials is conducted without difficulty, especially in such instances where the number of carbon atoms in the alkyl group are at least 16 or more. More than one alkyl group, having more than 12 carbon atoms, may be introduced into the atomic nucleus.

Various other condensing agents in addition to zinc chloride, aluminum chloride, etc. may be employed, such as ferric chloride, stannic chloride, titanium chloride, etc. or a mixture of 2 or more of the various condensing agents may be employed. It is often desirable to have present a small amount of acid, such as hydrochloric acid, in addition to the metallic halide condensing agent.

The step of fractional distillation in vacuo of the reaction product is of particular advantage in separating the alkyl aromatic compounds from impurities such as uncombined reagents and decomposition products which may be present, as well as from by-products of the nature of ketones which may be formed by the condensation of the aromatic compound with the organic acid produced as a by-product of the reaction. Thus, in the foregoing Examples 1, 2, and 3, the vacuum distillation serves to separate the desired cetyl phenol from palmityl phenol produced as a by-product by the action of the palmitic acid formed in the process.

Attention is directed to my co-pending application for patent, Ser. No. 117,585, filed December 24, 1936, in which there is described a demulsifying process similar to the one herein employed, except that the demulsifying agent consists of a sulfonated acylated aromatic material and particularly a sulfonated acylated phenolic material in which the acyl radical contains at least 8 carbon atoms. Since such sulfonated acylated aromatic compounds are effective demulsifying agents, it is obvious that there is no absolute need to make a separation of the kind described above; i. e., a separation of acetyl phenol from palmityl phenol, but a mixture of the two may be sulfonated so as to yield a very acceptable demulsifying agent. Such mixed sulfonic acids, of course, are usually converted into salts or may be converted into esters in the manner hereinafter described.

Moreover, said chemical compound may be used alone or in admixture with other suitable well known classes of demulsifying agents, such as demulsifying agents of the modified fatty acid type, the petroleum sulfonate type, the ordinary alkylated sulfo-aromatic type, etc.

Having obtained cetyl phenol, ceryl phenol, cetyl cresol, ceryl cresol, or similar materials in the manner previously described, I subject them to conventional sulfonation so as to obtain a maximum yield of the corresponding sulfonic acid which may be indicated by the formula type:

OH.T.D.SO₃H in which T is an aromatic residue and D is an alkyl group having more than 12 carbon atoms. However, as previously pointed out, such materials need not be derived from phenols but may be derived from unsubstituted materials or aromatic ous significance, and B represents any substituents other than a hydroxyl radical is present. In such event the formula would be indicated as follows:

B.T.D.SO₃H in which the various characters have their previous significance, and B represents any substituent atom or radical introduced into the aromatic nucleus.

In so far that more than one substituent may be introduced into the nucleus, and in so far that more than one alkyl radical, having more than 12 carbon atoms, may be introduced, it is desirable to change the preceding formula somewhat in order to indicate the broadest aspects of the composition or type of demulsifying agent which may be employed in the present process. As will be pointed out hereinafter, one need not employ the material as a free sulfonic acid and, in fact, it is not desirable to do so due to the corrosiveness of such acid. The material is preferably converted into a salt or may even be converted into an ester, particularly by forming the sulfonchloride. Furthermore, one might form a disulfonic acid, or trisulfonic acid, or possibly even a tetrasulfonic acid. For this reason the composition of the reagents employed in the process is best indicated by the following formula:

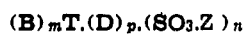
(B)ₘT.(D)ₚ.(SO₃.Z)ₙ in which the various characters have their previous significance, and Z represents an ionizable hydrogen atom equivalent, m represents the numerals 0, 1 or 2, p represents the numerals 1 or 2, and n represents the numerals 1, 2 or 3, with the proviso that generally in monocyclic compounds m+n+p cannot exceed 3, and generally in polycyclic compounds m+n+p cannot exceed 6.

It is understood that these materials are characterized by the presence of a sulfonic acid radical, and may be in the form of the free acid itself or the salt or ester. For instance, in the procedure outlined above the products are manufactured as acids. Such sulfonic acid may be used as a demulsifying agent in the present process for breaking petroleum emulsions. However, due to the corrosive properties of such acidic material, it is more desirable to convert the material into a salt or ester. Esterification of such sulfonic acids is rather expensive because it is generally necessary to convert the sulfonic acid into a sulfonchloride and react the sulfonchloride with a suitable alcohol. From a practical standpoint it is most desirable, therefore, to use these materials in the form of a salt. Free sulfonic acids of the kind described may be reacted with any suitable base, such as caustic soda, caustic potash, ammonium hydroxide, or the like, so as to convert the materials into the corresponding salts. Similarly, instead of ammonia, one may use triethanolamine, diethanolamine, benzylamine, cyclohexylamine, monoamylamine, diamylamine, triamylamine, or any other suitable amine. Sulfonic acids of the kind described above may be reacted with calcium oxide, magnesium oxide, and the like. Similarly, one may produce heavy metal salts, such as copper salts, iron salts, lead salts, etc. The heavy metal salts and higher molecular weight amine salts are often oil-soluble. In some instances the higher molecular weight amine salts may be oil and water soluble. My preferred demulsifying agent is obtained by use of an amine, including alkylolamines, such as triethanolamine, to produce a water-soluble salt. As previously stated, one may convert the sulfonic acids into suitable esters derived from alcohol, such as methyl alcohol, ethyl alcohol, propyl alcohol, butyl alcohol, amyl alcohol, hexyl alcohol, benzyl alcohol, cyclohexanol, etc. It is understood, of course, that the process is not limited to any particular way of manufacturing chemical compounds employed, but that such chemical compounds may be made in any suitable manner without limitation.

For sake of convenience, the ammonium radical and substituted ammonium radicals are considered as the equivalent of metallic atoms, and the expression "metallic atom equivalent" is intended to include the metallic atoms themselves or the ammonium or substituted ammonium radicals.

My preferred reagent is prepared by neutralizing cetyl phenol monosulfonic acid with an equivalent amount of cyclohexylamine. On many occasions I found that even better demulsifiers are obtained if one neutralizes cetyl beta naphthol sulfonic acid with monoamylamine, or if cetyl cresol sulfonic acid is neutralized with triethanolamine.

It is well known that conventional demulsifying agents may be used in a water-soluble form, or in an oil-soluble form, or in a form exhibiting both oil and water solubility. Sometimes they may be used in a form which exhibits relatively limited water solubility and relatively limited oil solubility. However, since such reagents are sometimes used in a ratio of 1 to 10,000 or 1 to 20,000, or even 1 to 30,000, such an apparent insolubility in oil and water is not significant, because said reagents undoubtedly have solubility within the concentration employed. This same fact is true in regard to the material or materials employed as the demulsifying agent of my process.

In practicing my process a treating agent or demulsifying agent of the kind above described is brought into contact with or caused to act upon the emulsion to be treated, in any of the various ways or by any of the various apparatus now generally used to resolve or break petroleum emulsions with a chemical reagent, the above procedure being used either alone or in combination with other demulsifying procedure, such as the electrical dehydration process.

It is understood that the use of this process is not limited to any particular isomeric form of the chemical compound or compounds disclosed, but that one isomeric form is as suitable as another.

In the claims the expression "sulfonated alkylated aromatic body" is intended to include the various materials broadly; i. e., in the form of acids, salts or esters, without restriction as to the particular form in which the ionizable hydrogen atom equivalent of the sulfonic acid radical occurs.

Having thus described my invention, what I claim as new and desire to secure by Letters Patent is:

1. A process for breaking petroleum emulsions of the water-in-oil type, which consists in subjecting the emulsion to the action of a demulsifying agent comprising a sulfonated alkylated aromatic body in which the alkyl group is substituted in a nuclear hydrogen atom position, and is characterized by containing more than 12 carbon atoms and not over 30 carbon atoms.

2. A process for breaking petroleum emulsions of the water-in-oil type, which consists in subjecting the emulsion to the action of a demulsifying agent comprising a chemical compound of the formula type:

$$(B)_m T.(D)_p.(SO_3.Z.)_n$$

in which B represents any substituent atom or radical introduced into the aromatic nucleus, T is an aromatic residue, D is an alkyl group having more than 12 carbon atoms and not over 30 carbon atoms, and Z represents an ionizable hydrogen atom equivalent, $m$ represents the numerals 0, 1 or 2, $p$ represents the numerals 1 or 2, and $n$ represents the numerals 1, 2 or 3.

3. A process for breaking petroleum emulsions of the water-in-oil type, which consists in subjecting the emulsion to the action of a demulsifying agent comprising a chemical compound of the formula type:

$$(B)_m T.(D)_p.(SO_3.Z.)_n$$

in which B represents any substituent atom or radical introduced into the aromatic nucleus, T is an aromatic residue, D is an alkyl group having more than 12 carbon atoms and not over 30 carbon atoms, and Z represents an ionizable hydrogen atom equivalent, $m$ represents the numerals 1 or 2, $p$ represents the numerals 1 or 2, and $n$ represents the numerals 1, 2 or 3.

4. A process for breaking petroleum emulsions of the water-in-oil type, which consists in subjecting the emulsion to the action of a demulsifying agent comprising a chemical compound of the formula type:

$$OH.T.(D)_p.(SO_3.Z.)_n$$

in which T is an aromatic residue, D is an alkyl group having more than 12 carbon atoms and not over 30 carbon atoms, and Z represents an ionizable hydrogen atom equivalent, $p$ represents the numerals 1 or 2, and $n$ represents the numerals 1, 2 or 3.

5. A process for breaking petroleum emulsions of the water-in-oil type, which consists in subjecting the emulsion to the action of a demulsifying agent comprising a chemical compound of the formula type:

$$OH.T.(D).(SO_3.Z.)$$

in which T is a monocyclic aromatic residue, D is an alkyl group having more than 12 carbon atoms and not over 30 carbon atoms, and Z represents an ionizable hydrogen atom equivalent.

6. A process for breaking petroleum emulsions of the water-in-oil type, which consists in subjecting the emulsion to the action of a demulsifying agent comprising a chemical compound of the formula type:

$$OH.T.(D).(SO_3.Z.)$$

in which T is a monocyclic aromatic residue, D is an alkyl group having more than 12 carbon atoms and not over 30 carbon atoms, and Z is an acidic hydrogen atom.

7. A process for breaking petroleum emulsions of the water-in-oil type, which consists in subjecting the emulsion to the action of a demulsifying agent comprising a chemical compound of the formula type:

$$OH.T.(D).(SO_3.Z.)$$

in which T is a monocyclic aromatic residue, D is an alkyl group having more than 12 carbon atoms and not over 30 carbon atoms, and Z is an organic radical.

8. A process for breaking petroleum emulsions of the water-in-oil type, which consists in subjecting the emulsion to the action of a demulsifying agent in the form of a salt comprising a chemical compound of the formula type:

$$OH.T.(D).(SO_3.Z.)$$

in which T is a monocyclic aromatic residue, D is an alkyl group having more than 12 carbon atoms and not over 30 carbon atoms, and Z is a metallic atom equivalent.

9. A process for breaking petroleum emulsions of the water-in-oil type, which consists in subjecting the emulsion to the action of a demulsifying agent in the form of a water-soluble salt comprising a chemical compound of the formula type:

$$OH.T.(D).(SO_3.Z.)$$

in which T is a monocyclic aromatic residue, D is an alkyl group having more than 12 carbon atoms and not over 30 carbon atoms, and Z is a metallic atom equivalent.

10. A process for breaking petroleum emulsions of the water-in-oil type, which consists in subjecting the emulsion to the action of a demulsifying agent in the form of a water-soluble salt comprising a chemical compound of the formula type:

$$OH.T.(D).(SO_3.Z.)$$

in which T is a monocyclic aromatic residue, D is an alkyl group having more than 12 carbon atoms and not more than 30 carbon atoms, and Z is an amine radical.

11. A process for breaking petroleum emulsions of the water-in-oil type, which consists in subjecting the emulsion to the action of a demulsifying agent in the form of a water-soluble salt comprising a chemical compound of the formula type:

$$OH.T.(D).(SO_3.Z.)$$

in which T is a $C_6H_3$ radical, D is an alkyl group having more than 12 carbon atoms and not more than 30 carbon atoms, and Z is an amine radical.

12. A process for breaking petroleum emulsions of the water-in-oil type, which consists in subjecting the emulsion to the action of a demulsifying agent in the form of a water-soluble salt comprising a chemical compound of the formula type:

$$OH.T.(D).(SO_3.Z.)$$

in which T is a $C_6H_3$ radical, D is an alkyl group having more than 12 carbon atoms and not more than 30 carbon atoms, and Z is an alkylolamine radical.

13. A process for breaking petroleum emulsions of the water-in-oil type, which consists in subjecting the emulsion to the action of a demulsifying agent in the form of a water-soluble salt comprising a chemical compound of the formula type:

$$OH.T.(D).(SO_3.Z.)$$

in which T is a hydroxy phenyl residue, D is a cetyl radical, and Z is an alkylolamine radical.

MELVIN DE GROOTE.

---

CERTIFICATE OF CORRECTION.

Patent No. 2,083,223.   June 8, 1937.

MELVIN DE GROOTE.

It is hereby certified that error appears in the printed specification of the above numbered patent requiring correction as follows: Page 3, first column, line 66, strike out the syllable and words "ous significance, and B represents any" and insert instead materials in which some substituent or; and that the said Letters Patent should be read with this correction therein that the same may conform to the record of the case in the Patent Office.

Signed and sealed this 20th day of July, A. D. 1937.

Henry Van Arsdale (Seal)   Acting Commissioner of Patents.